(12) United States Patent
Wismer

(10) Patent No.: US 6,212,378 B1
(45) Date of Patent: Apr. 3, 2001

(54) SPACECRAFT CELLULAR COMMUNICATION SYSTEM IN WHICH THE RETURN CONTROL RECEIVE SLOT DURATION IS A FUNCTION OF ANTENNA BEAM DIRECTION

(75) Inventor: Lee D. Wismer, Downingtown, PA (US)

(73) Assignee: Lockheed Martin Corp., King of Prussia, PA (US)

( * ) Notice: Subject to any disclaimer, the term of this patent is extended or adjusted under 35 U.S.C. 154(b) by 0 days.

(21) Appl. No.: 09/133,182

(22) Filed: Aug. 12, 1998

Related U.S. Application Data
(60) Provisional application No. 60/059,312, filed on Sep. 17, 1997.

(51) Int. Cl.[7] .................................................... H04Q 7/36
(52) U.S. Cl. .................... 455/429; 435/430; 435/12.1; 370/321
(58) Field of Search ................................ 455/427, 428, 455/429, 430, 12.1, 13.1, 13.2, 450, 13.3; 370/319, 321, 323

(56) References Cited

U.S. PATENT DOCUMENTS

| | | | |
|---|---|---|---|
| 5,592,481 | * | 1/1997 | Wiedeman et al. ................. 455/12.1 |
| 5,644,572 | * | 7/1997 | Olds et al. ............................. 455/13 |
| 5,974,315 | * | 10/1999 | Hudson ............................. 455/12.1 |
| 6,014,372 | * | 1/2000 | Kent et al. ............................ 455/427 |

* cited by examiner

*Primary Examiner*—Lee Nguyen
(74) *Attorney, Agent, or Firm*—W. H. Meise

(57) ABSTRACT

A spacecraft cellular time-division multiple access (TDMA) communication system (10) includes a spacecraft (12) with an antenna (12a) which produces multiple beams (20a, 20b, 20c) in different directions, to form footprints (20af, 20bf, 20cf) at different locations, including the nadir (3) and the horizon (5). User terminals (16a, 16b, 16c) in each footprint (20af, 20bf, 20cf) transmit reverse control signals (312) as bursts in TDMA time slots over uplinks (106, 110, 114), which are routed by the spacecraft to a network control center (NCC 18), to aid in controlling the operation of the system (10). The NCC (18) receives the bursts within receive time slots (310, 314, 316) which have durations which depend upon the origin of the reverse control signals. Those reverse control signals (310) received from footprints (20af) near the nadir (3) are received in receive slots (310) which are shorter in duration than the duration of receive time slots (312) in which reverse control signal bursts are received from footprints (20cf) near the horizon (5). This allows more guard time for reception of bursts from antenna beams in which there is more potential time error from one edge of the antenna beam to the other edge.

4 Claims, 8 Drawing Sheets

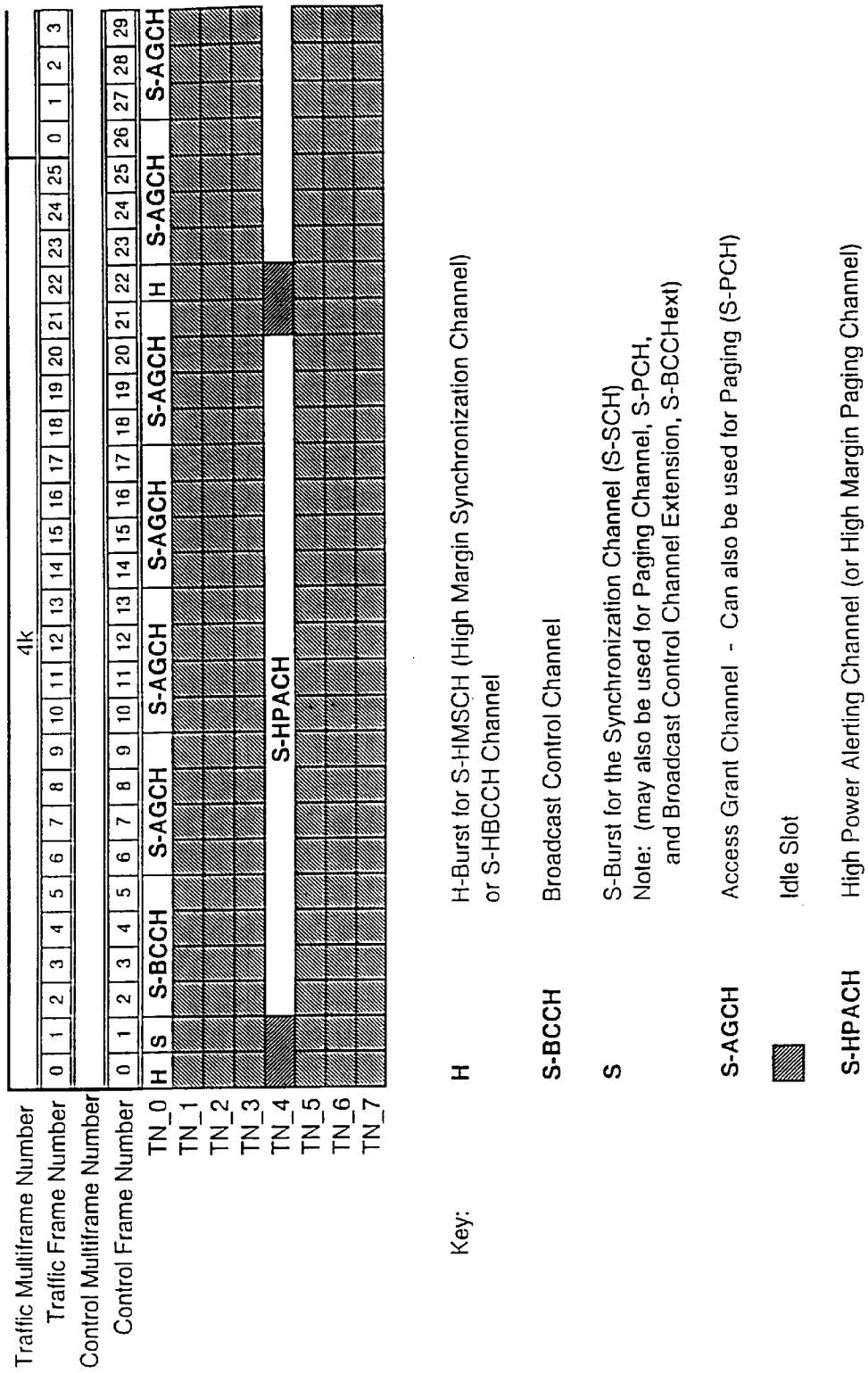

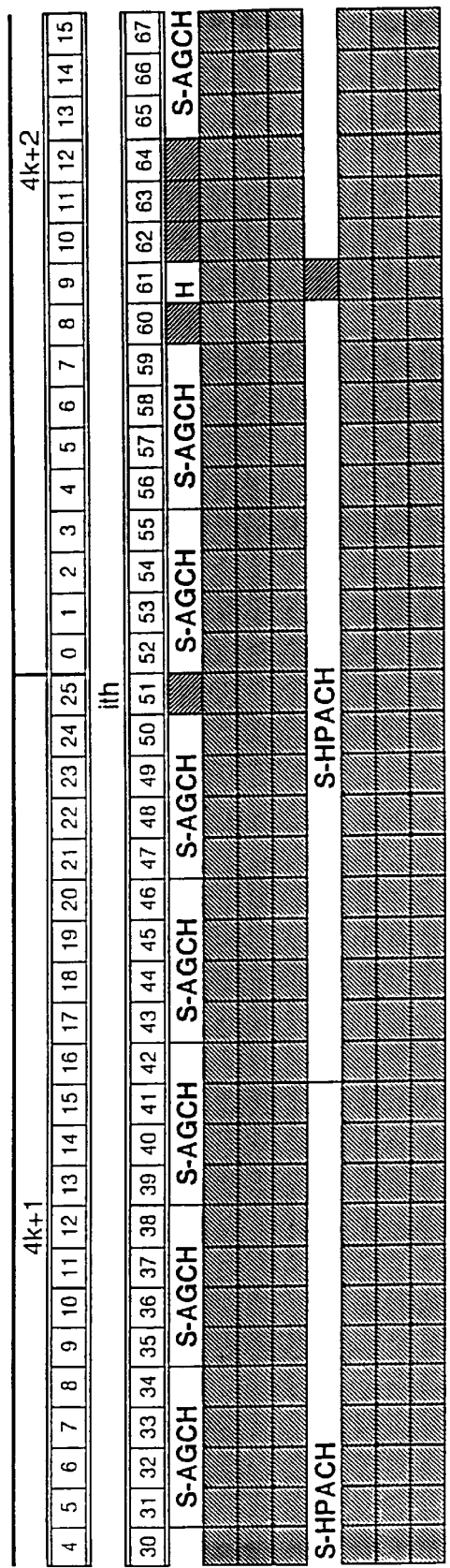
Figure 5b: Forward TDMA frame mapping for control Channels (IMSI Version)

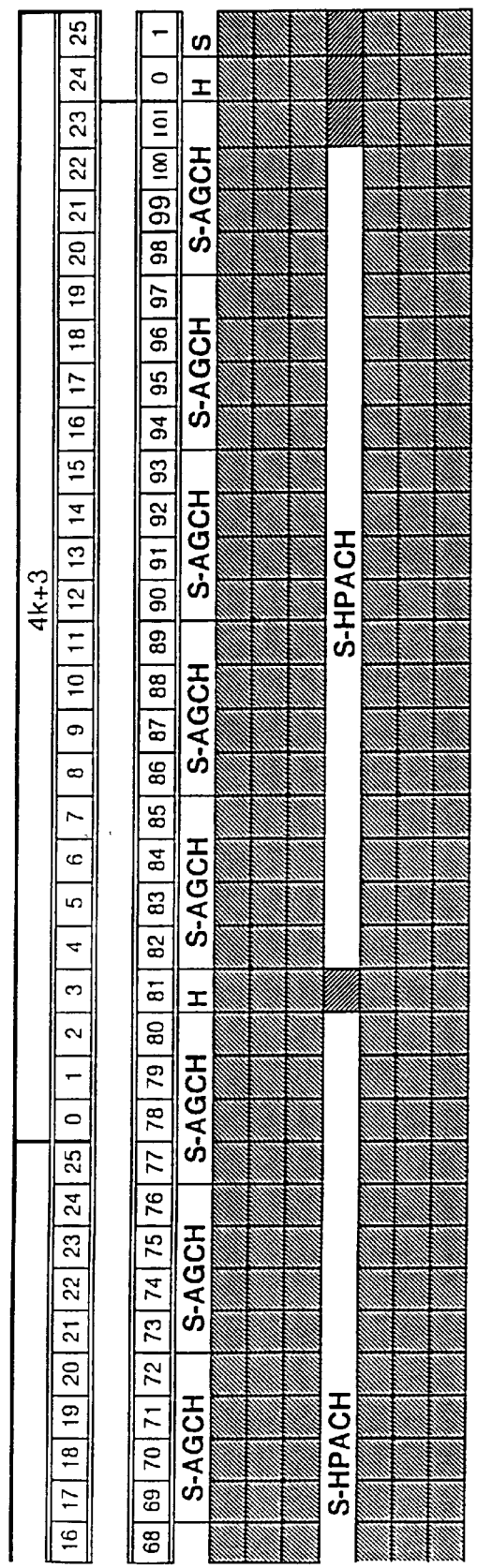
Figure 5c: Forward TDMA frame mapping for control Channels (IMSI Version)

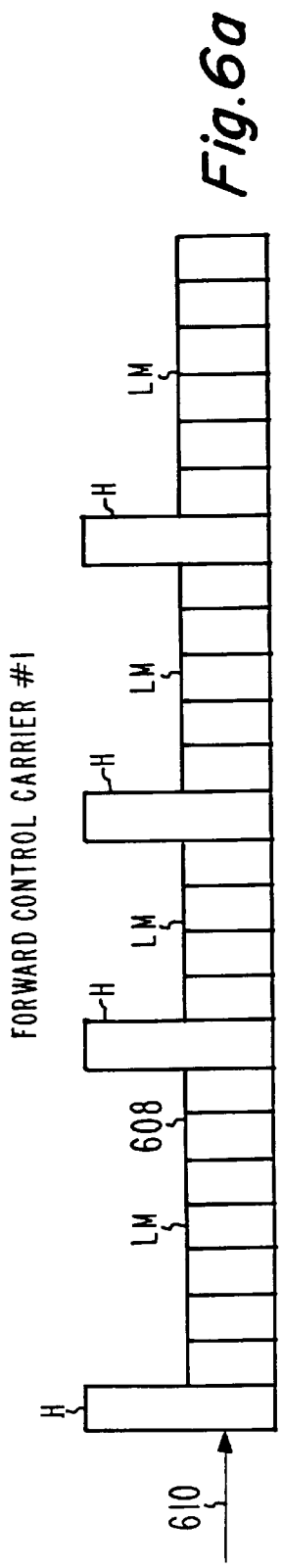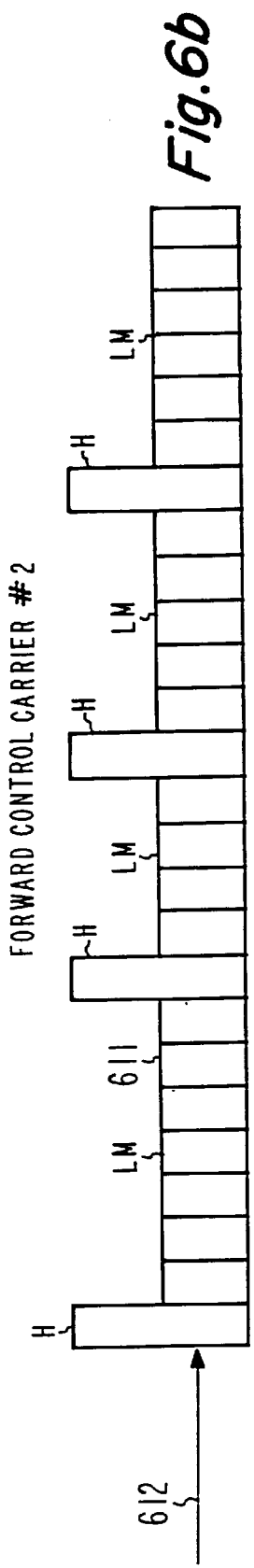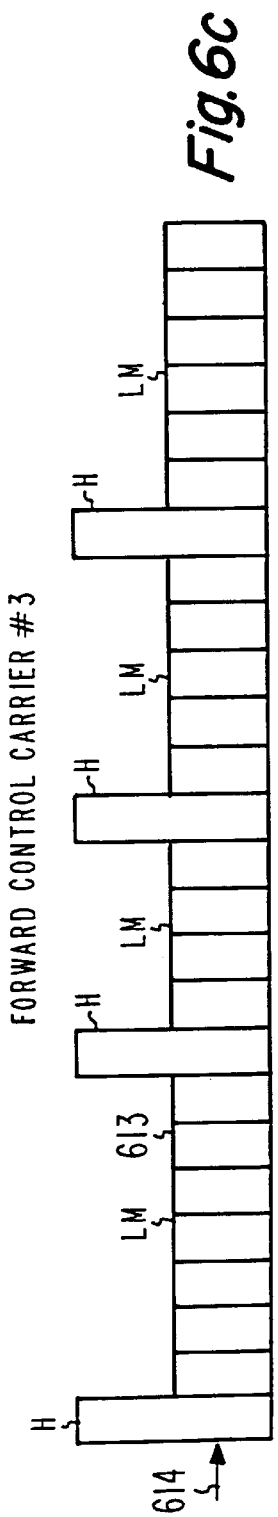

SPACECRAFT CELLULAR COMMUNICATION SYSTEM IN WHICH THE RETURN CONTROL RECEIVE SLOT DURATION IS A FUNCTION OF ANTENNA BEAM DIRECTION

This application claims benefit of Provisional application Ser. No. 60/059,312, filed Sep. 17, 1997.

BACKGROUND OF THE INVENTION

Mobile cellular communication systems have become of increasing importance, providing mobile users the security of being able to seek aid in case of trouble, allowing dispatching of delivery and other vehicles with little wasted time, and the like. Present cellular communication systems use terrestrial transmitters, such as towers, to define each cell of the system, so that the extent of a particular cellular communication system is limited by the region over which the towers are distributed. Many parts of the world are relatively inaccessible, or, as in the case of the ocean, do not lend themselves to location of a plurality of dispersed cellular sites.

In these regions of the world, spacecraft-based communication systems may be preferable to terrestrial-based systems. It is desirable that a spacecraft cellular communications system adhere, insofar as possible, to the standards which are common to terrestrial systems, and in particular to such systems as the GLOBAL SYSTEM FOR MOBILE COMMUNICATIONS system (GSM), which is in use in Europe.

The GSM system is a cellular communications system which communicates with user terminals by means of electromagnetic transmissions from, and receptions of such electromagnetic signals at, base stations, fixed sites or towers spaced across the countryside. The term "user terminal" for purposes of this patent application includes mobile user terminals, and also includes hand-held and fixed user terminals, but not gateways. The GSM system is described in detail in the text *The GSM System for Mobile Communications,* subtitled *A Comprehensive Overview of the European Digital Cellular System,* authored by Michel Mouly and Marie-Bernadette Pautet, and published in 1992 by the authors, at 4, rue Elisée Reclus, F-91120 Palaiseau, France. Another text describing the GSM system is *Mobile Radio Communications,* by Raymond Steele, published 1992 by Pentech Press, London, ISBN 0-7273-1406-8. Each base station of the GSM system includes transmitter and receiver arrangements, and communicates with user terminals by way of signals in a bandwidth of 50 MHz, centered on 900 Mhz., and also by way of signals having a bandwidth of 150 Mhz centered on 1800 Mhz.

A cellular communication system should provide one or more control channels for allowing a user terminal to initially synchronize to the system, and to initiate communications with the overall network. Each base station, fixed site, or tower continually transmits network synchronization information (SCH) and network-specific information (BCCH), which a user terminal uses to synchronize to the appropriate network at initial turn-on of the user terminal. The GSM system provides a channel denominated "Random Access Channel" or RACH. In GSM, the RACH channel is used for initial synchronization of the network to the user terminal.

Spacecraft cellular communication systems are desired.

SUMMARY OF THE INVENTION

A spacecraft-based cellular time-division multiple access communication system for communication among terrestrial user terminals and terrestrial gateway terminals includes a spacecraft including a receiving arrangement, a frequency-dependent routing arrangement, a transmitting arrangement, and an antenna arrangement coupled to the transmitting and receiving arrangements. The antenna arrangement forms a plurality of beams directed toward the Earth's surface, each in a different direction, so that each beam overlies a different terrestrial footprint, some of which footprints may lie closer to the nadir than to the horizon, and others of which footprints may lie closer to the horizon than to the nadir, the receiving arrangement being for at least receiving reverse control signals transmitted over the beams from at least the user terminals, and for receiving forward control signals transmitted over at least one of the beams by way of uplink frequencies. The routing arrangement is for routing the reverse control signals and the forward control signals received by the receiving arrangement to appropriate ones of the transmitting arrangements in response to the uplink frequencies. The transmitting arrangement is for transmitting the reverse control signals and the forward control signals on at least one downlink frequency carried over one of the beams, so that the spacecraft operates in a bent-pipe manner. A plurality of the reverse and forward control signals may be transmitted from the spacecraft. The communication system 10 includes a plurality of first terrestrial user communication terminals. Each of the first terrestrial user communication terminals is adapted for transmitting reverse control signals to the spacecraft by way of burst transmissions on at least one of the uplink frequencies in a first beam associated with a particular one of the footprints within which the first terrestrial user communication terminals lie. The footprint of the first beam lies near the nadir. The communication system also includes a plurality of second terrestrial user communication terminals. Each of the second terrestrial user communication terminals is adapted for transmitting reverse control signals to the spacecraft by way of burst transmissions on at least one of the uplink frequencies in a second beam associated with a particular one of the footprints within which the second terrestrial user communication terminals lie. The second footprint lies near the horizon. The communication system includes a network control center coupled to the communication system, for generating forward control signals for transmission to the terrestrial user terminals, for assigning time slots for transmissions to and from the terrestrial user terminals in a time-division multiple access manner, and for receiving the reverse control signals during receive time slots, the durations of the receive time slots selected for reception of the reverse control signals from the first terrestrial user terminals being exceeded by the durations of the receive time slots selected for reception of the reverse control signals from the second terrestrial user terminals, whereby burst transmissions from terrestrial user terminals within footprints lying nearer the horizon than to the nadir, which are potentially subject to a greater range of time delays than those burst transmissions from terrestrial user terminals lying nearer to the nadir than to the horizon, are received within longer receive time slots, which longer receive time slot tends to accommodate a greater range of temporal error. In a particular embodiment of the invention, the spacecraft includes a solar panel and power supply arrangement which produces electrical power for energizing the spacecraft and for generating the energy to be transmitted over the beams, and in this embodiment the network control center generates a single control signal carrier for each of the spot beams in order to reduce to a minimum the power requirements on the solar panel and power supply arrangement. In a communication system in which communications are desired between the terrestrial user terminals and a public switched telephone network, the system further comprises at least one gateway terrestrial terminal coupled to the public switched telephone network and communicating with the spacecraft under the control of the network control center, so that information signals may be routed among the terrestrial user terminals and users of the public switched telephone network. The network control center may be physically located separate from the one gateway terrestrial terminal.

BRIEF DESCRIPTION OF THE DRAWING

FIGS. 5a, 5b, and 5c together constitute a timeline illustrating the mapping of the forward control signals in the $i^{th}$ control multiframe; and FIGS. 6a, 6b, and 6c illustrate three time-offset time lines.

DESCRIPTION OF THE INVENTION

Figure 1:
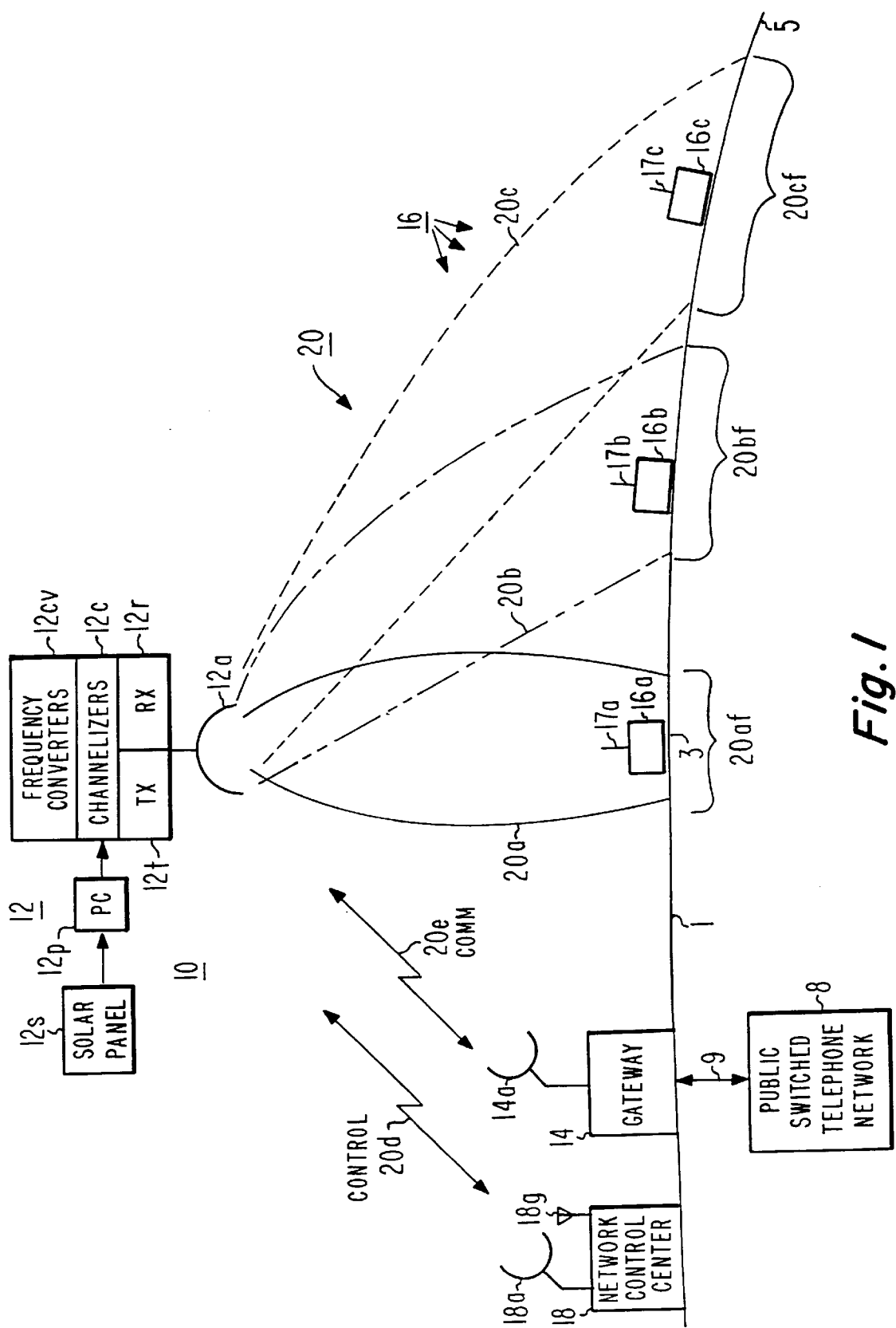
FIG. 1 is a simplified diagram of a spacecraft cellular communications system in accordance with an aspect of the invention, illustrating some antenna beams which define system cells, and the extent of footprints of antenna beams directed at the nadir and at the horizon.

This invention relates to cellular communications systems, and more particularly to such systems which provide coverage between terrestrial terminals in a region by way of a spacecraft, where some of the terrestrial terminals may be mobile terminals, and some may be gateways which links the cellular system with a terrestrial network such as a public switched telephone network (PSTN).

A salient feature of a spacecraft communication satellite is that all of the electromagnetic transmissions to the user terminals originate from one, or possibly a few, spacecraft. Consequently, the spacecraft communication antenna must form a plurality of beams, each of which is directed toward a different portion of the underlying target region, so as to divide the target area into cells. The cells defined by the beams will generally overlap, so that a user communication terminal may be located in one of the beams, or in the overlap region between two beams, in which case communication between the user communication terminal and the spacecraft is accomplished over one of the beams, generally that one of the beams which provides the greatest gain or signal power to the user terminal. Operation of spacecraft communication systems may be accomplished in many ways, among which is Time-Division Multiple Access, (TDMA), among which are those systems described, for example, in conjunction with U.S. Pat. No. 4,641,304, issued Feb. 3, 1987, and U.S. Pat. No. 4,688,213, issued Aug. 18, 1987, both in the name of Raychaudhuri. Spacecraft time-division multiple access communication systems are controlled by a controller which synchronizes the transmissions to account for propagation delay between the terrestrial terminals and the spacecraft, as is well known to those skilled in the art of time division multiple access systems. The control information, whether generated on the ground or at the spacecraft, is ultimately transmitted from the spacecraft to each of the user terminals. Consequently, some types of control signals must be transmitted continuously over each of the beams in order to reach all of the potential users of the system. More specifically, since a terrestrial terminal may begin operation at any random moment, the control signals must be present at all times in order to allow the terrestrial terminal to begin its transmissions or reception (come into time and control synchronism with the communication system) with the least delay.

When the spacecraft is providing cellular service over a large land mass, many cellular beams may be required. In one embodiment of the invention, the number of separate spot beams is one hundred and forty. As mentioned above, each beam carries control signals. These signals include frequency and time information, broadcast messages, paging messages, and the like. Some of these control signals, such as synchronization signals, are a prerequisite for any other reception, and so may be considered to be most important. When the user communication terminal is synchronized, it is capable of receiving other signals, such as paging signals.

Communication Spacecraft are ordinarily powered by electricity derived from solar panels. Because the spacecraft may occasionally go into eclipse, the spacecraft commonly includes rechargeable batteries and control arrangements for recharging the batteries when the power available from the solar panels exceeds the power consumed by the spacecraft payload. When a large number of cellular beams are produced by the antenna, a correspondingly large number of control signals must be transmitted from the spacecraft. When one hundred and forty beams are transmitted, one hundred and forty control signals must be transmitted. When the power available from the solar panels is divided between the information and data transmission channels of the spacecraft, the power available to the synchronization and paging signals may be at a level such that a user communication terminal in an open-air location may respond, but a similar terminal located in a building may not respond, due to attenuation of electromagnetic signals by the building.

FIG. 1 is a simplified block diagram of a spacecraft or satellite cellular communications system 10. In system 10, a spacecraft 12 includes a transmitter (TX) arrangement 12t, a receiver (RX) arrangement 12r, and a frequency-dependent channelizer 12c, which routes bands of frequencies from the receiver 12r to the transmitter 12t. Spacecraft 12 also includes an array of frequency converters 12cv, which convert each uplink frequency to an appropriate downlink frequency. Spacecraft 12 includes a power source which includes a solar panel (SP) illustrated as 12s, and a power converter (PC) or conditioner 12p for converting the solar array power into power suitable for powering the transmitter, receiver, and converters, and other devices on the spacecraft, such as, for example, attitude control systems. Antenna 12a generates a plurality 20 of spot beams, one or more spot beams for each frequency band. Some of the spot beams 20a, 20b, and 20c of set 20 are illustrated by their outlines, while others, such as 20d and 20e, are illustrated by "lightning bolt" symbols in order to simplify the drawing. Each spot beam 20x (where x represents any subscript) defines a footprint on the surface 1 of the earth below. The footprint associated with spot beam 20a is at the nadir 3 directly under the spacecraft, and is designated 20af. The footprint associated with spot beam 20c is designated 20cf, and is directed toward the horizon 5, while the footprint 20*bf* associated with spot beam 20*b* is on a location on surface 1 which lies between nadir 3 and horizon 5. It will be understood that those spot beams which are illustrated in "lightning bolt" form also produce footprints. As is known to those skilled in the art, the footprints of spot beams from a spacecraft may overlap (overlap not illustrated), to provide continuous coverage of the terrestrial region covered by the spot beams.

For completeness, it should be noted that each antenna beam forms an infinite number of more-or-less concentric "footprints" centered about the maximum-beam-intensity point on the ground, with each being a fraction of a decibel (dB) less than the next inner footprint. When "a" footprint is discussed, a selected energy distribution across the "footprint" is assumed. Thus, a common assumption is that the beam intensity will not vary more than 3 dB across the footprint, which defines the extent of the footprint by the 3 dB contour of the antenna beam. Similarly, overlap of the beams is taken to mean overlap at the designated beam intensity.

As illustrated in FIG. 1, a group 16 of mobile terrestrial user terminals or stations includes three user terminals, denominated 16*a*, 16*b*, and 16*c*, each of which is illustrated as having an upstanding whip antenna 17*a*, 17*b*, and 17*c*, respectively. User terminal 16*a* lies on or within the footprint 20*af*, user terminal 16*b* lies within footprint 20*bf*, and user terminal 16*c* lies within footprint 20*cf*. User terminals 16*a*, 16*b*, and 16*c* provide communications service to users, as described below. Those skilled in the art will recognize that the illustration of a single user terminal in each footprint is only for ease of understanding, and that many such user terminals may be found in each footprint. More particularly, each illustrated user terminal 16*a* represents one of a plurality of user terminals which may be found within footprint 20*af*, and likewise illustrated user terminals 16*b* and 16*c* each represent one of a plurality of user terminals which may be found in footprints 20*bf* and 20*cf*, respectively.

FIG. 1 also illustrates a terrestrial gateway terminal (a fixed site, tower, or station) 14, which lies in a footprint (not designated) of spot beam 20*e*. While not illustrated, it should be understood that the footprint associated with spot beam 20*e* may also contain user terminals such as $16_x$. Gateway terminal 14 communicates with spacecraft 12 by way of electromagnetic signals transmitted from an antenna 14*a*, and receives signals from the spacecraft by way of the same antenna. Gateway terminal 14 is coupled by a data path 9 with a land-line network or public switched telephone system (PSTN) illustrated as a block 8, and provides communication between spacecraft cellular communications system 10 and the PSTN 8. While a single gateway 14 is illustrated, the system 10 may contain many gateways at spaced-apart locations, to allow the spacecraft communication system to access different PSTNs. The signals traversing antenna beam 20*e* represent information signals from the user terminals 16 to the gateway terminal 14, and information signals from the gateway to various ones of the user terminals. The information signals are designated generally as COMM.

A network control center (NCC) 18 is illustrated in FIG. 1 as a terrestrial terminal lying in a footprint (not designated) of antenna beam 20*d*, which may also contain user terminals (not illustrated). Network control center 18 includes an antenna 18*a* for communication with the spacecraft, and for communication by way of the spacecraft to the user terminals 16 and the gateway(s) 14. Network control center 18 also includes a GPS receiving antenna 18*g* for receiving global positioning time signals, to provide position information and an accurate time clock. Network control center 18 performs the synchronization and TDMA slot control which the spacecraft cellular communications network requires. The functions of network control center 18 may be distributed throughout the communication system 10, but unlike the arrangement of the GPS system, in which control of the slot timing is independently set at each cell center or tower, there is only one network control center associated with the spacecraft communication system 10, for the required control of the time-division multiple access slots cannot be applied simply to one cell or antenna beam, but rather must be applied across the entire system, for reasons which are made clear below. While network control center 18 is illustrated in FIG. 1 as being separate from gateway 14, those skilled in the art will recognize that the network control center 18 includes functions, such as the antenna 18*a*, which are duplicated in the gateway 14, and that it may make economic sense to place the network control center 18, or the portions which together make up the network control center, at the sites of the gateway(s) such as gateway 14, so as to reduce the overall system cost by taking advantage of the redundancies to eliminate expensive subsystems. The signals traversing antenna beam 20*d* between NCC 18 and spacecraft 12 represent control signals. "Forward" control signals proceed from the NCC 18 to the remainder of the communication system 10 by way of spacecraft 12, and "reverse" or "return" control signals are those which originate at terrestrial terminals other than the NCC, and which are sent to the NCC by way of the spacecraft. Forward control signals include, for example, commands from the NCC 18 to the various user terminals $16_x$, indicating which slot set is to be used by each user terminal for communication, while an example of a return control signal may be, for example, requests by various user terminals $16_x$ for access to the communication system 10. Other control signals are required, some of which are described in more detail below. As mentioned, those control signals flowing from NCC 18 to other portions of the communication system 18 are termed "forward" control signals, while those flowing in a retrograde direction, from the communication system 10 toward the NCC, are denominated "return" control signals.

The spacecraft 12 of FIG. 1 may need to produce many spot beams 20, and the transmissions over the spot beams may require substantial electrical power, at least in part because of the relatively low gain of the simple antennas 17 of the user terminals 16. In order to reduce the power required by the transmitters in the spacecraft, the largest number of downlink frequencies, namely those used for transmissions from the spacecraft to terrestrial user terminals, are desirably within a relatively low frequency band, to take advantage of the increased component efficiencies at the lower frequencies. The user terminals transmit to the spacecraft at the lower frequencies, for like reasons. The transmissions to and from the spacecraft from the NCC 18 and the gateway(s) 14 may be within a higher frequency band, in part because of FCC frequency allocation considerations, and in part to obtain the advantage of high antenna gain available at the higher frequencies from antennas at fixed installations. In a specific embodiment of the invention, the uplinks and downlinks of the NCC and the gateways may be at C-band (frequencies at about 3400 to 6700 MHz.), while the uplinks and downlinks of the user terminals are at L-band (frequencies at about 1500–1700 MHz). Thus, the uplink and downlink signals in antenna beams 20*a*, 20*b*, and 20*c* of FIG. 1 are at frequencies within the relatively low L-band, while the uplink and downlink signals in antenna beams 20*d* and 20*e* are at the higher C-band.

Figure 2:
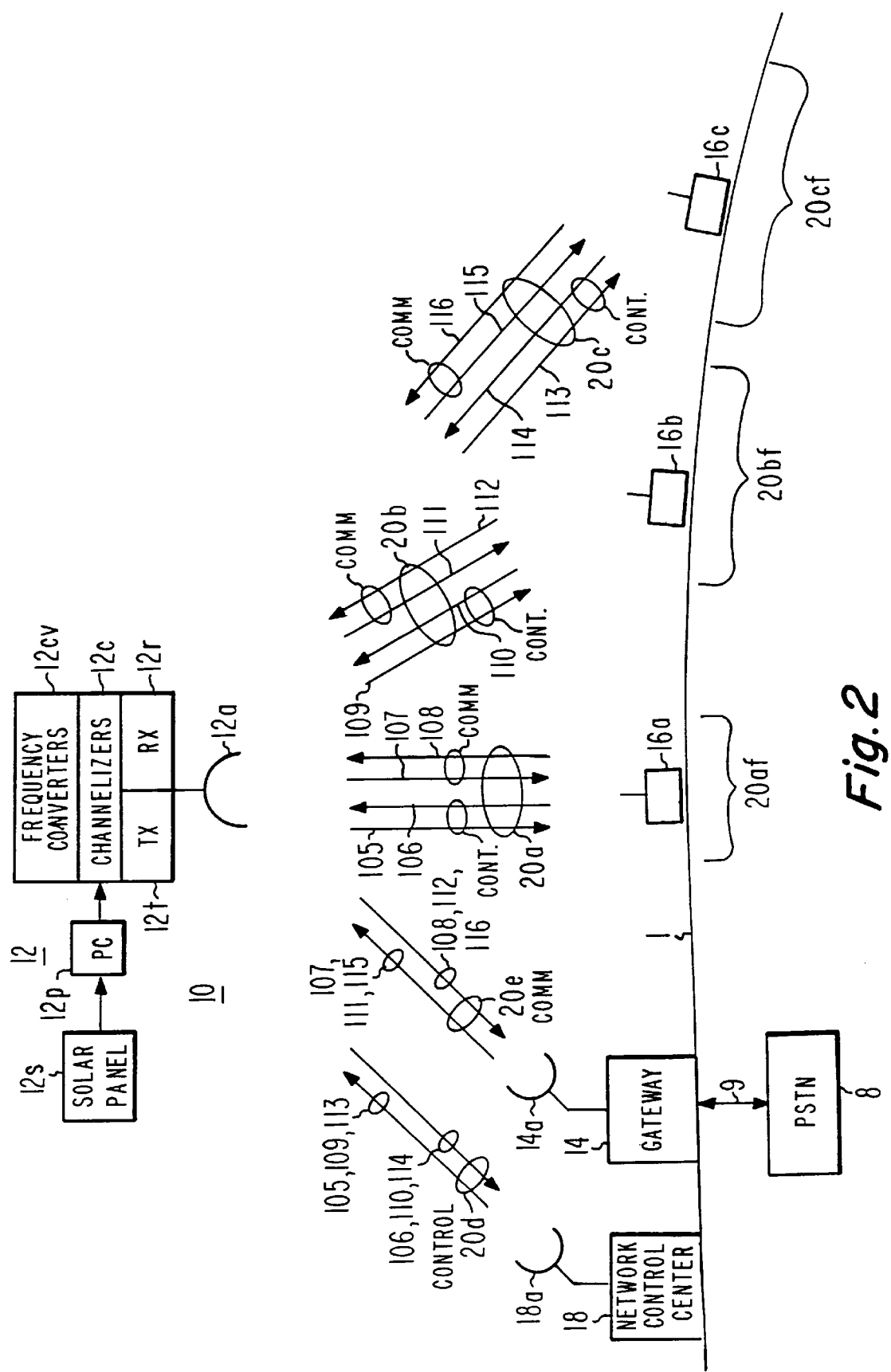
FIG. 2 is a simplified diagram similar to FIG. 1, illustrating some of the signals which flow over the various antenna beams.

FIG. 2 is similar to FIG. 1, except that, instead of illustrating the antenna beams 20$_x$ (where the subscript x represents any one of the antenna beams) as a whole, some of the individual carriers contained in the beams are illustrated separately. For example, some of the forward control signals flowing from network control center 18 to the spacecraft 12 over antenna beam 20d are designated 105, 109, and 113, while some of the return control signals flowing from the spacecraft 12 to the NCC 18 by way of antenna beam 20d are designated 106, 110, and 114. Each of these control signals is transmitted on a carrier of a different frequency, for reasons described below. Thus, the designations 105, 106, 109, 110, 113, and 114 in FIG. 2 may each be imagined to represent a different carrier frequency within C band. In practice in one embodiment of the invention, each of the forward control signals has a bandwidth of 200 KHz. As described below, each of the different uplinked control signal carriers will ultimately be routed to a different one of the antenna beams and its associated footprint; three footprints are illustrated in FIGS. 1 and 2, so three uplinked forward control signal carriers are illustrated, namely carriers 105, 109, and 113. Similarly, each of the different return control signal carriers 106, 110, 114 downlinked from spacecraft 12 is generated by a user terminal 16 in a different one of the footprints illustrated in FIGS. 1 and 2; three footprints are illustrated, so the downlink portion of antenna beam 20e includes the three carriers 106, 110, and 114.

As mentioned above in relation to the discussion of FIG. 1, the spacecraft 12 includes frequency-dependent channelizers 12c and frequency converters 12cv. The three forward control signals 105, 109, and 113 uplinked from NCC 18 of FIG. 2 to the spacecraft are received at antenna 12a of the spacecraft, and routed by way of the channelizers 12c of the spacecraft to an appropriate one of the frequency converters 12cv, where they are frequency converted. For example, uplinked forward control signal 105 of FIG. 2 arriving at the spacecraft over antenna beam 20d at C-band is converted from C-band to a frequency within L-band. In order to make it easy to track the flow of signals in FIG. 2, the L-band frequency corresponding to C-band frequency 105 is also designated 105. It is easy to keep the meaning of these identical designations in mind, by viewing them as identifying the control signals being transmitted; the forward control information on C-band uplink "frequency" 105 is retransmitted from the spacecraft, after frequency conversion to L-band, within antenna beam 20a, as downlink 105. Thus, the forward control signal information for all user terminals 16a lying within footprint 20af is uplinked from NCC 18 in C-band to the spacecraft over antenna beam 20d, and converted to L-band downlink frequency 105 at the spacecraft, and transmitted in the L-band form over antenna beam 20a for use by all user terminals 16a within footprint 20af. Similarly, uplinked control signal 109 arriving at the spacecraft over antenna beam 20d at C-band is converted from C-band to a frequency within L-band. In order to make it easy to track the flow of signals, the L-band frequency corresponding to C-band frequency 109 is also designated 109. The control information on C-band uplink "frequency" 109 is retransmitted from the spacecraft on L-band, within antenna beam 20b, as downlink 109. Thus, the forward control signal information for all user terminals 16b lying within footprint 20bf is uplinked from NCC 18 in C-band to the spacecraft over antenna beam 20d, and converted to an L-band downlink frequency 109 at the spacecraft, and transmitted in the L-band form over antenna beam 20b for use by all user terminals 16b within footprint 20bf. For completeness, control signals generated at NCC 18 for ultimate transmission to user terminals 16c in footprint 20cf is generated at C-band at a frequency 113 different from frequencies 105 and 109, and is uplinked from NCC 18 to spacecraft 12. The C-band control signal 113 received at spacecraft 12 is frequency-converted to a frequency, designated as 113, in L-band, and transmitted over antenna beam 20c for use by all user terminals 16c lying in footprint 20cf. It should be noted that the fact that forward control signals are transmitted on the same carriers to a group of user terminals 16 lying in a particular footprint does not necessarily mean that all the user terminals within that footprint must operate simultaneously or in the same manner; instead, within each control signal carrier, a plurality of TDMA slots are available, and each set of slots is capable of being directed or assigned to a different one of the user terminals within the footprint being controlled, so that the user terminals are individually controllable. Of course, simultaneous reception of broadcast forward control signals by all user terminals within a footprint is possible, and all user terminals receive information signals "simultaneously," in that they may all be receiving transmissions at the same "time" as measured on a gross scale, although each individual message is received in a different time slot allocation. It should also be noted that, while control signals have not been described as being transmitted over antenna beam 20e between spacecraft 12 and gateway 14, the gateway (and any other gateways throughout the system) also require such control signal transmission. In the event that the NCC and the gateway are co-located, the control signals flowing therebetween may be connected directly, rather than by being routed through the spacecraft.

When a user terminal 16$_x$ (where the subscript x represents any one of the user terminals) of FIG. 2 is initially turned on by a user, the user terminal will not initially have an assigned slot. In order to advise the NCC 18 that the user terminal is active and wishes to be assigned a slot by which it may communicate, the user terminal must first synchronize to the forward control signals, and then transmit a reverse control signal to the NCC 18 by way of spacecraft 12, requesting access in the form of assignment of an information carrier time slot. Thus, in addition to the forward control signals flowing from NCC 18 to the user terminals 16$_x$, additional return control signals also flow from the user terminals to the NCC 18. These control signals originating from the user terminals lying within a particular footprint are modulated onto uplink carriers at L-band and transmitted to the spacecraft, where they are converted to frequencies lying in C-band for transmission to the NCC 18. More particularly, return control signals originating at user terminals 16a lying within footprint 20af are modulated onto an L-band uplink carrier frequency designated as 106 in FIG. 2. The return control signals are received by spacecraft antenna 12a in beam 20a, and routed by channelizer 12c to the appropriate frequency converter of converter array 12cv for conversion to C-band frequency 106. C-band frequency 106 is routed by way of transmitter 12t to antenna 12a, for transmission over antenna beam 20d to NCC 18. Similarly, return control signals originating at user terminals 16b lying within footprint 20bf are modulated onto an L-band uplink carrier frequency designated as 110 in FIG. 2. The return control signals are received by spacecraft antenna 12a in beam 20b, and routed by channelizer 12c to the appropriate frequency converter 12cv for conversion to C-band frequency 110. C-band frequency 110 is routed by way of transmitter 12t to antenna 12a, for transmission over antenna beam 20d to NCC 18. For completeness, return control signals from user terminals 16c in footprint 20cf are modulated onto an L-band uplink carrier frequency designated as 114, and are received by spacecraft antenna 12a in beam 20c, routed to the appropriate frequency converter 12cv, converted to C-band frequency 114, and transmitted over antenna beam 20d to NCC 18. Thus, NCC 18 transmits a single forward control signal carrier to each downlink spot beam 20a, 20b, 20c, . . . on a carrier at a frequency which identifies the downlink spot beam to which the forward control signal is directed. NCC 18 receives return control signals from the various user terminals in footprints associated with the spot beams, and one return carrier is associated with each spot beam. In each spot beam, user terminals receive forward control signals over a carrier in an L-band downlink, and transmit return control signals over an L-band uplink. Spot beam 20a is associated with forward and return control signal carriers 105 and 106, respectively, spot beam 20b is associated with forward and return control signal carriers 109 and 110, respectively, and beam 20c is associated with forward and return control signal carriers 113 and 114, respectively.

Only the control signal carriers have been so far described in the arrangement of FIG. 2. The whole point of the communication system 10 is to communicate information signals among the users, so each antenna beam also carries signal carriers on which information signals are modulated or multiplexed by FDMA/TDMA, under control of the NCC 18. It should first be noted that NCC 18 of FIG. 2 does not need any information signal carriers (unless, of course, it is associated with a gateway terminal as described above). In general, information signals flow between gateways and user terminals. More particularly, signals from public switched telephone system 8 of FIG. 2 which arrive over data path 9 at gateway 14 must be transmitted to the designated user terminal or other gateway, which is likely to be served by an antenna beam other than beam 20d which serves gateway 14. Gateway 14 must communicate the desired recipient by way of a return control signal to NCC 18, and receive instructions as to which uplink carrier is to be modulated with the data from PSTN 8, so that the data carrier, when frequency-converted by the frequency converters 12cv in spacecraft 12, is routed to that one of the antenna beams which serves the desired recipient of the information. Thus, when information is to be communicated from gateway 14 to the remainder of communication system 10, it is transmitted on a selected one of a plurality of uplink carriers, where the plurality is equal to the number of spot beams to be served. In the simplified representation of FIG. 2, three spot beams 20a, 20b, and 20c are served in the system, so gateway 14 must produce information signal carriers at three separate C-band uplink frequencies. These three carrier frequencies are illustrated as 107, 111, and 115. The information signal is modulated onto the appropriate one of the carriers, for example onto carrier 107, and transmitted to the spacecraft 12. At the spacecraft, the C-band carrier 107 is converted to an L-band frequency carrier, also designated 107, which is downlinked over spot beam 20a to those user terminals (and gateways, if any) lying in footprint 20af. Similarly, information modulated at gateway 14 onto C-band uplink carrier 111, and transmitted to the spacecraft, is converted to L-band carrier 111, and downlinked over spot beam 20b to user terminals lying in footprint 20bf. For completeness, information modulated at gateway 14 onto C-band uplink carrier 115, and transmitted to the spacecraft, is converted to L-band carrier 115, and downlinked over spot beam 20c to user terminals lying in footprint 20cf. Within each footprint, the various user terminals select the information signals directed or addressed to them by selecting the particular time slot set assigned by NCC 18 for that particular communication.

Each user terminal lying in a footprint (and gateway, if any) of system 10 of FIG. 2 must be able to transmit information to the spacecraft for reradiation to a desired recipient. In general, all user terminals communicate only with gateways. If a user terminal of the system wishes to communicate with another user terminal of the system, the information may be routed first to one of the gateways, and then from the gateway back to the intended recipient user terminal. In one mode of operation, the user terminals may communicate directly with other user terminals in other spot beams. Thus, any user terminal 16a lying in footprint 20af of FIG. 2 communicates its information signals by modulating them onto (a selected slot set of) an L-band carrier 108. The transmission is received by antenna 12a of spacecraft 12, and the signal is routed by way of channelizers 12c to the appropriate frequency converter of converter array 12cv, where conversion to a C-band frequency takes place. For example, L-band uplink information signal carrier 108 received by the spacecraft in spot beam 20a is converted to a C-band carrier frequency also designated 108, which is downlinked over antenna beam 20e to gateway 14. Similarly, L-band uplink information signal carrier 112 received by the spacecraft in spot beam 20b is converted to a C-band carrier frequency also designated 112, which is downlinked over antenna beam 20e to gateway 14, and uplink signal carrier 116 of antenna beam 20c is converted to downlink carrier 116 of antenna beam 20e to gateway 14. The user terminals (and gateways) in each spot beam thus transmit their information signals on uplink carriers having frequencies selected so that, after frequency conversion and channelization at the spacecraft, the resulting downlink carriers travel the particular antenna beam which is directed toward the recipient gateway. Similarly, signals originating at a gateway are modulated onto carriers which, after frequency conversion and channelizing at the spacecraft, traverse that one of the spot beams associated with the footprint in which the designated recipient is located. It should be noted that part of the system control performed by the NCC 18 is to determine the spot-beam in which a designated mobile recipient is located by keeping a record of the last location of each identifiable user, so that each spot beam does not have to be individually polled each time a connection to a mobile user is requested, to "find" the desired mobile user.

Once a user terminal 16x of FIG. 2 which wishes to initiate service on the network is synchronized with the network, it transmits information on a spacecraft random access channel (S-RACH), which is part of the return control signal channel, by which control information is transmitted on an uplink such as 106 of FIG. 2. Since the particular user has not yet been assigned a slot set, the initial request for access is not scheduled by the NCC, but is transmitted within a slot, since time synchronization has already been achieved. The duration of the return control signal bursts generated by the user terminals must be short enough to fit within the NCC receiving slot interval, and should be sufficiently shorter than the slot interval to provide an appropriate guard interval. The durations of the transmitted return control signal bursts are predetermined at the time of manufacture of the user terminals, or set before use, to match the receive slot intervals of the system in which they are to be used.

Figure 3A:
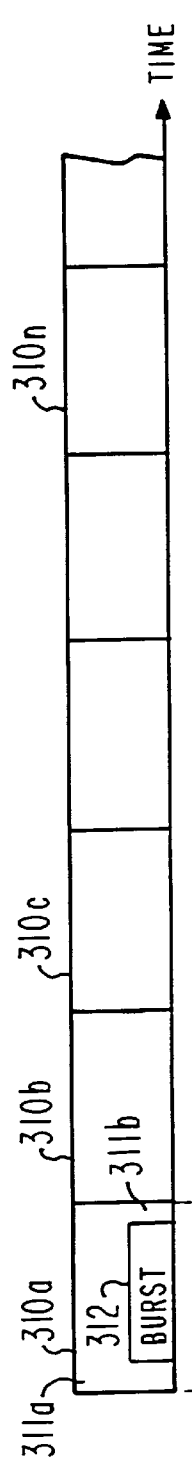
FIGS. 3a, 3b, and 3c are simplified time lines illustrating the durations of the return control signal TDMA receive slots, according to an aspect of the invention, which depend upon the location of the footprint of the spot beam at locations close to nadir, between nadir and horizon, and near the horizon, respectively.
Figure 3B:
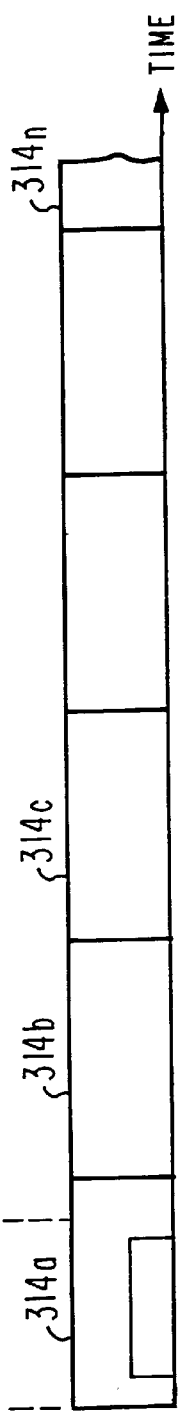
Figure 3C:
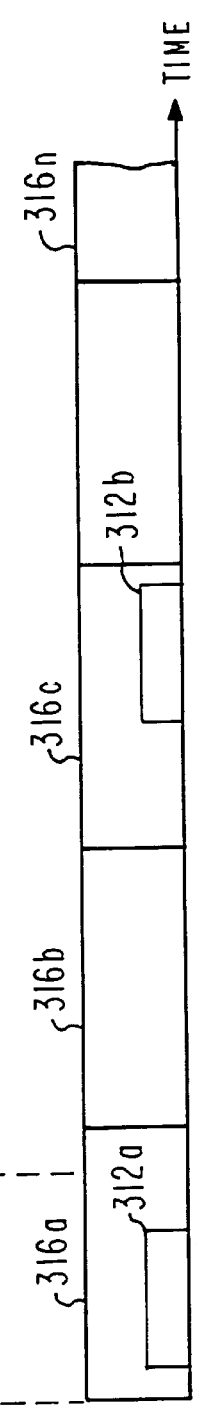

According to an aspect of the invention, the NCC receives return control signal bursts from user terminals with a receive slot duration which depends upon, or is a function of, the location of the footprint of the beam in which the user terminal lies. FIGS. 3a, 3b, and 3c are time-lines which represent receive slot intervals by which the NCC 18 of FIGS. 1 and 2 receives return control signal bursts from user terminals lying in footprints 20af, 20bf, and 20cf, respectively, of FIG. 1. In FIG. 3a, the receive slots 310a, 310b, 310c, . . . , 310n are relatively short, just slightly longer than the duration of a typical return control signal burst 312, illustrated as being associated with receive slot 310a. The guard times are illustrated as 311a and 311b. The receive slot durations 310a, 310b, 310c, . . . , 310n are appropriate for reception of bursts 312 which do not have substantial variation in their receive times, such as those which are transmitted from footprint 20af, in which there is no significant difference of propagation delay between user terminals at either edge of the footprint; the guard time is used only for errors attributable to factors other than propagation delay differences. In FIG. 3c, the durations of receive slots 316a, 316b, 316c, . . . , 316n are longer than the durations of slots 310a, 310b, 310c, . . . , 310n, while the durations of the transmitted return control signal bursts 312 remain the same. The result, as illustrated in FIG. 3c, is that the combination of guard times 317a and 317b is larger than the combination of 311a and 311b. This increased guard time is appropriate for reception of burst transmissions from a footprint which lies near horizon 5, such as footprint 20cf of FIG. 1. The distances between antenna 12a and the right and left edges of footprint 20cf of FIG. 1 differ, and this difference represents a propagation time difference between the spacecraft 12 and user terminals located near the two edges of the footprint. By making the receive slot duration relatively large, the burst 312 can occur anywhere within the receive slot, and still be recognized. Thus, burst 312a associated with receive slot interval 316a lies near the beginning of the interval, whereby it may be surmised that the user terminal which transmitted burst 312a was located near that edge of footprint 20cf which lay closer to the spacecraft. Similarly, burst 312b of FIG. 3c, received within slot interval 316c, lies near its right edge, whereupon it will be realized that the location of the corresponding user terminal which transmitted burst 312b lay near the outermost extremity of footprint 20cf of FIG. 1. In FIG. 3b, the durations of receive slots 314a, 314b, 314c, . . . , 314n are longer than the durations of slots 310a, 310b, 310c, . . . , 310n, but shorter than the durations of receive slots 316a, 316b, 316c, . . . , 316n, while the durations of the transmitted return control signal bursts 312 remain the same. The result, as illustrated in FIG. 3b, is that the combination of guard times 315a and 315b is larger than the combination of 311a and 311b. This increased guard time is appropriate for reception of burst transmissions from a footprint which lies between nadir 3 and horizon 5, such as footprint 20bf of FIG. 1. The return control carrier time slots have durations which are the same (a standard duration) across the entire communication system 10. While there is no necessary requirement which establishes the time by which the return control slots of more distant footprints are increased, it has been found to be convenient to increase the time durations in increments equal to the duration of one standard time slot.

Figure 4:
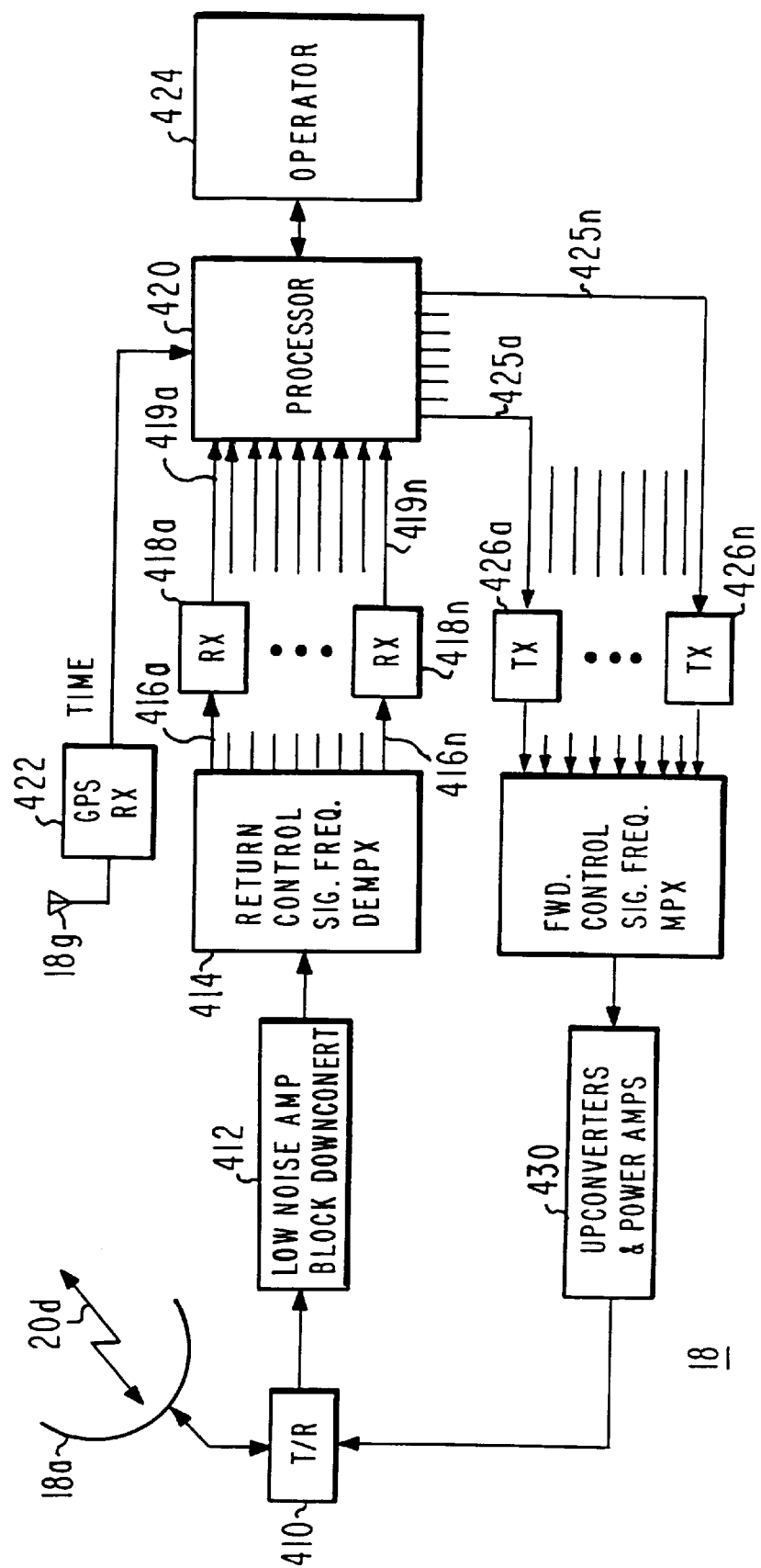
FIG. 4 is a simplified block diagram of a network control center for generating return control signal receive slots in accordance with an aspect of the invention.

The setting by the NCC 18 of FIG. 1 of the control return slot duration in dependence upon the footprint location merely requires a knowledge of which return control signal carrier frequencies correspond to which antenna beams, and therefore the footprints. It is a simple matter to set the receive slot duration at the NCC in accordance with the frequency of the return control signal carrier. FIG. 4 is a simplified block-diagram representation of an NCC in accordance with the invention. In FIG. 4, NCC 18 includes a transmit-receive (T/R) module 410 which couples antenna 18a to the input port of a low-noise amplifier and block downconverter illustrated together as 412, and to the output port of an upconverter and power amplifier arrangement 430. Low-noise amplifier and block downconverter 412 converts the C-band return control signal carriers to an intermediate frequency, and couples the downconverted signals to a return control signal carrier frequency demultiplexer 414, separates the downconverted return control signal carriers, so that only one downconverted return signal carrier appears on each output signal port 416a–416n of demultiplexer 414. Since each different return control signal carrier is associated with a different one of the spacecraft antenna beams $20_x$, the identity of the antenna beam footprint from which each of the return control signal carriers originates is established by a simple one-to-one memory. The return control signals are converted to baseband, if not already at baseband, by an array of receivers (RX) 418a–418n, where n equals the number of spot antenna beams. As mentioned, the number of spot antenna beams in one embodiment of the invention is one hundred and forty. The baseband return control signals at the outputs of receivers 418a–418n are applied by way of signal paths 419a–419n to a processor 420, in which they are decoded and interpreted with the aid of time signals originating from a global positioning signal receiver 422 coupled to GPS antenna 18g. It should be understood that each signal path 419a–419n is itself is preferably a multibit data path. The processor 420 autonomously generates the control signals for the communication system 10, in that the control of the various slot intervals and commands is accomplished at too high a speed for direct human intervention. However, high-level or overall functioning is controlled by an operator console illustrated as 424.

The processor 420 of FIG. 4 produces, as its output, sets of forward control signal commands at baseband, with each set of forward control signals on one signal path of an array of signal paths 425a–425n. Each set of forward control signals on one of signal paths 425a–425n is destined for one spot beam. The baseband forward control signal sets appearing on signal paths 425a–425n are applied to an array of transmitters (TX) 426a–426n, respectively, for modulation as necessary, and for upconversion to the uplink C-band frequency range. The output signal of each transmitter 426a–426n is a forward control signal destined for a particular one of the spot beams, at an uplink carrier frequency which, after passing through the remainder of the NCC 18 of FIG. 4, and through channelizers 12c and frequency converters 12cv of the spacecraft, is routed over the appropriate spot beam to the desired footprint. The signals from transmitters 426a–426n are applied to a forward control signal frequency multiplexer 428, which combines the various control signals into one signal path, and applies the forward control signals so combined to a block 430, representing upconversion to the C-band uplink frequency, and power amplification as needed. The C-band uplink frequency signal, with all of its forward control signals, is applied by way of TR arrangement 410 to antenna 18a for transmission to the spacecraft.

The processing performed in processor 420, to set the slot duration for receiving the return control signals, in accordance with which path 419a–419n the particular return control signal appears on, is a trivial task, and requires no further explanation. There will ordinarily be no reason for dynamic allocation of slot duration, so the return control signal slot duration associated with each input signal path can be simply stored in memory. If the frequencies of the control signal carriers allocated to the various spot beams should change, or if more spot beams should be added, or if a spot beam should be redirected from a location close to nadir to a location nearer to the horizon, the memory may be reprogrammed by the operator.

These forward control signals may include commands for utilizing resources. In relation to the access request signals, the computer informs the user terminal in which direction, and in what amount, of time adjustment, required to synchronize the user terminal to the network. It may also compare the user identity with a log to validate the user, read the telephone number to which a user wishes to be connected, and to determine to which of many gateway terminals the call should be assigned.

FIGS. 5a, 5b, and 5c illustrate the time assignment of the various forward control signals generated by the NCC 18 of FIG. 4 for one forward control carrier destined for one spot beam. As illustrated in FIGS. 5a, 5b, and 5c, one control multiframe (the $i^{th}$ multiframe is illustrated) includes one-hundred and two control frames numbered 0 to 101. Each of the control frames includes eight slots, numbered 0 to 7. For example, the first control frame illustrated in FIG. 3a is numbered 0, and includes eight slots, numbered TN_0, TN_1, TN_2, TN_3, TN_4, TN_5, TN_6, and TN_7. Similarly, the second control frame illustrated in FIG. 3a is numbered 1, and includes eight slots, numbered TN_0, TN_1, TN_2, TN_3, TN_4, TN_5, TN_6, and TN_7. Each slot illustrated in FIGS. 5a, 5b, and 5c has a duration of 156.25 bit intervals.

Thus, the progress of time in the timeline of FIGS. 5a, 5b, and 5c is not simply from left to right in the conventional manner, for the timeline would be too long to illustrate conveniently. Instead, time progresses from TN_0 of control frame 0, and then in sequence through TN_1, TN_2, TN_3, TN_4, TN_5, TN_6, and TN_7 of control frame 0, and from slot TN_7 of control frame 0 to the first slot (slot TN_0) in control frame 1. From the time associated with time slot TN_0 of control frame 1, the time line flows in sequence through slots TN_1, TN_2, TN_3, TN_4, TN_5, TN_6, and TN_7 of control frame 1, and from slot TN_7 of control frame 1 to the first slot (slot TN_0) in control frame 2. From this explanation, it will be understood that the time recurrently flows from top to bottom, left to right, through the time line of FIGS. 5a, 5b, and 5c.

Four traffic multiframes are illustrated in FIG. 5a, arbitrarily designated 4k, 4k+1, 4k+2, and 4k+3. The arbitrary value is a time marker which identifies the interval within a long period of time, such as three hours, to prevent any gross synchronizing errors. Each traffic multiframe 4k, 4k+1, 4k+2, and 4k+3 has a duration of twenty-six traffic frames; since the duration of each traffic frame is equal to the duration of a control frame, the first traffic multiframe 4k has a duration of twenty-six control frames. It should be noted that these four traffic multiframes frames 4k, 4k+1, 4k+2, and 4k+3 do not exactly align with the $i^{th}$ control multiframe, in that the combination of the four traffic multiframes 4k, 4k+1, 4k+2, and 4k+3 has a duration of one-hundred and four (104) control or traffic frames, while the $i^{th}$ control multiframe has a duration of one-hundred and two (102) control/traffic frames. In effect, the four-traffic-multiframe set "drifts" by two control/traffic frames per control multiframe. The traffic frames have the same duration as the control frames, so the four traffic multiframes 4k, 4k+1, 4k+2, and 4k+3 are in effect associated with one-hundred and four (104) control frames, while the $i^{th}$ control multiframe is associated with one-hundred and two (102) control frames.

In the $i^{th}$ forward control signal multiframe of FIGS. 5a, 5b, and 5c, the first time slot TN_0 in control multiframe 0 is designated H, representing a high-margin synchronizing signal (H), which is required in order to allow the user terminal to acquire frequency and bit synchronization so as to identify a particular set of time slots of the control multiframe, for synchronizing to the control multiframe. Other high-margin control signals occur in the $i^{th}$ forward control signal multiframe, as described below. Time slots TN_1, TN_2, and TN_3 of control frame 0 are not initially assigned, as represented by lower-left-to-upper-right hatching in those slots. Slot TN_4 of control frame 0 is enforced idle, as suggested by the opposite-direction hatching. Slot intervals TN_5, TN_6, and TN_7 of control frame 0 are unassigned. These unassigned TDMA slot intervals, and other unassigned slot intervals described below, may be assigned to other control signals, or to traffic use, if desired, at some later time. TDMA slot TN_0 of control frame 1 is assigned to a synchronization burst (S), for providing the traffic frame number information to the user terminal, while the remaining slot intervals TN_1–TN-3 and TN_5–TN_7 are unassigned, and TN_4 is mandatorily idle. The first TDMA slot TN_0 of control frames 2, 3, 4, and 5 are assigned for use by the broadcast channel (S-BCCH), which provides general-purpose network information which is broadcast to all user terminals within the footprint of the beam with which the time line of FIGS. 5a, 5b, and 5c is associated, for identifying the spot beam in which the signal is broadcast, the communication system identification, the spacecraft from which the beam originates, and the like. The remaining TDMA slots of control frames 2, 3, 4, and 5 are unassigned, except for the TN_4 slot, which is assigned for use by a high power alerting channel (S-HPACH), for alerting user terminals of incoming calls. Time slots TN_0 of control frames 6, 7, 8, and 9 are assigned to the access grant channel, for transmitting information relating to the granting of access to one user terminal; the granting of access requires assigning of a traffic carrier frequency, and of identifying the particular TDMA slot set of that carrier which is to be used. Similarly, time slot TN_0 of control frames 10, 11, 12, and 13 are also assigned to S-AGCH; many such transmissions may be necessary per unit time, because there may be many user terminals which request access during each second of time, and the grant of access must be at the same rate of many access grants per second. Thus, S-AGCH signals are assigned to the first TDMA slots intervals of control frames 14–29 (except control frame 22) of FIG. 5a, and to the first slot interval of all control frames 30–101 of FIGS. 5b and 5c except control frames 51, 60, and 62–64, which are mandatory idle, and control frames 61 and 81, which are assigned for use by high margin synchronization control signals H. Thus, high margin synchronization control signals H occur in the first TDMA slot at the beginning of each control multiframe (at control frame 0), and at control frames 22, 61, and 81. The separation or pulse timing between the first and second H signals of each control multiframe is 22 control frame intervals, the separation between the second and third H signals of each control multiframe is 39 control frame intervals, the separation between the third and fourth H signals of each control multiframe is 20 control frame intervals, and the separation between the last H signal of one multiframe and the first H of the next control multiframe is 21 control frame intervals. Thus, the temporal spacing between mutually adjacent H signals is 22, 39, 20, and 21 control frame intervals. These nonuniform intervals are provided to aid the user terminals in identifying the beginning of the control multiframe, for faster synchronizing to the system.

In the time line of FIGS. 5a, 5b, and 5c, the high power alerting channel S-HPACH is provided for during the TN_4 slot interval of all the control frames 0–101, except for those which are mandatorily idle, which are the TN_4 slot intervals of control frames 0, 1, 21, 22, 61, 81, and 101. The idle slot intervals are provided in the same control frame as the H burst so that the high-margin H burst does not occur in the same frame as the high-margin signal S-HPACH, to thereby tend to reduce the power loading, and makes it simple to perform the calculations, described below, required to achieve offsetting the time lines.

The high-margin synchronization channel signals H of FIGS. 5a, 5b, and 5c, which occur four times during each control signal multiframe interval, are high margin because they are transmitted at a higher power level than the signals of ordinary margin. This is readily accomplished by, for example, increasing the power produced by a transmitter of array 426a–426n of FIG. 4 during that time in which it transmits an H signal or other high-margin signal. Identification of a high-margin signal may be carried from the computer 420 to the individual transmitters 426a–426n on a dedicated data path of each of data paths 425a–425n, where a logic high on the dedicated data path for that transmitter, for example, indicates that the data being transmitted is a high-margin signal, and the power level should be raised. As those skilled in the art of transmitters know, it is a simple matter to increase the output power of an active stage by switching an attenuator out-of-line, or by incrementing the supply voltage, or both.

According to an aspect of the invention, the peak output power of the spacecraft attributable to control signals is reduced from that which would occur if the high-margin signals were to occur synchronously. Keeping in mind that the time-line of FIGS. 5a, 5b, and 5c represents the time-line for one forward control channel out of one-hundred and forty channels (in one embodiment), it is undesirable that all of the high margin control signals occur simultaneously, because the simultaneous occurrence would require a peak power capability many times the average power capability. The weight and complexity required for such a high peak power capability is reduced by unsynchronizing the time lines of the various channels relative to each other. FIGS. 6a, 6b, and 6c illustrate how three forward control signal time-lines 608, 611, and 613 can be offset in time or unsynchronized in a manner which tends to prevent simultaneous occurrence of high-margin signals H. As illustrated in FIG. 6a, the time-lines 608, 611, and 613 include high-amplitude portions H spaced apart by lower-amplitude or lower-margin portions LM. Time-line 608 is delayed by an amount 610 from an arbitrary reference time. Similarly, the time-line 611 of FIG. 6b is delayed by a different amount 612 from the arbitrary reference time, in a manner which misaligns the H signals of FIGS. 6a and 6b in time. Similarly, the time line 613 of FIG. 6c, representing a third forward control signal channel, is delayed by a third amount 614, so that the high-margin signals H of the time line of FIG. 6c are misaligned in time relative to those of FIGS. 6a and 6b. In a similar manner, each of many time lines may be offset to misalign their H signals. Since one embodiment of the communication system according to the invention has one-hundred and forty individual spot beams, it also has a like number of forward control channels. Thus, it is necessary to unsynchronize 140 different time lines similar to that of FIGS. 5a, 5b, and 5c. Referring once again to FIGS. 5a, 5b, and 5c, it will be noted that the minimum number of control frame intervals between successive H signals is 20 intervals. Since each of the control frame intervals has eight slots, a minimum of 160 slot intervals occurs between successive H intervals. This is less than the number of spot beams, so it is possible to unsynchronize the 140 time lines by mutually delaying them by increments of a slot interval. Thus, the time line of FIG. 6b is delayed by 2 slot intervals from the time line of FIG. 6a, so that their H intervals are separated in time by two slot intervals. Similarly, the time line of FIG. 6a is delayed by an integer number of time intervals, illustrated as two, relative to the time line of FIG. 6c. While both differences are by increments of two slot intervals, the increments may be in any number of slot intervals which provides the desired unsynchronization, and may be by fractions of a slot interval if the number of forward control signal channels is very large, and exceeds the number of slots in the frame. It should be noted that it is not necessary to eliminate every simultaneous occurrence of the high-margin signals, but instead it is sufficient to eliminate some or preferably most of the simultaneous occurrences.

Implementation of the offset of the synchronization in the described manner is a simple matter, readily accomplished in the computer or processor 420 of FIG. 4. No additional description is believed to be required in order for a person of ordinary skill in the processor arts to be able to set up the requisite timing relationships. A concomitant of the requirement for simultaneous control of the forward channel slot timing is that a single NCC 18 must perform all the controlling for the entire communication system 10, unlike the arrangement of GSM, in which each separate cell location can contain its own NCC, independent of the control at other cell locations.

It is very desirable to minimize the power required to be produced by the spacecraft power source 12s, 12p of FIG. 1. The reduced power requirements allows the spacecraft to operate with a smaller solar panel power system than would otherwise be required, which is very advantageous from the point of view of spacecraft propellant load, in that more attitude control and stationkeeping propellant can be carried, and the operational lifetime of the spacecraft may therefore be longer.

The low gain of the whip or portable antenna 17 of the user terminals 16 of FIG. 1 tends to require greater effective radiated power (ERP) from the spacecraft 12 to establish reception with a given signal-to-noise ratio than if a more elaborate antenna were available at the user terminal. The possibility that the user terminal may be located within a building or other structure which tends to attenuate signals transmitted from the spacecraft to the mobile user terminal imposes a requirement that the signals transmitted from the spacecraft have a power greater than the minimum which the mobile user terminal is capable of detecting when the user terminal is located outdoors and under optimal reception conditions. In order to minimize the power requirements imposed on the spacecraft, only a single multipurpose forward control signal, modulated onto a carrier, is transmitted from the spacecraft over each antenna beam. The concomitant of this limitation is that the mobile user terminals in each antenna beam can rely only on one control signal for achieving all their communication control functions.

At the time of inception of communication between a mobile user terminal and another terminal by way of the spacecraft, before synchronization is fully established, the terrestrial user terminal 16x of FIG. 1 must receive signals arriving at its location from the spacecraft, and scan the signals so received in order to determine which spot beams are available in its location, and to synchronize itself to the cellular communications system 10. In order make such determinations, the mobile user terminal must in the first instance be able to receive the control signal which is transmitted from the spacecraft over the particular antenna beam associated with the footprint in which the user terminal lies. As mentioned above, there is only one forward control signal associated with each beam, and it is imperative that the user terminal be able to receive at least those portions of the forward control signal required for initial synchronization. Among the signals which must be received are paging signals, which are transmitted by the spacecraft to alert the user of a terrestrial station. If the user (and his portable terminal) is within a building or in a location which attenuates electromagnetic signals, the paging signal may not be received. In order to alleviate this problem, it is desirable to transmit this paging signal, and other important control signals, with the maximum possible power. However, the total power required for the control signals must be minimized, especially since there is one control carrier per antenna beam, and there may be 140 or more antenna beams produced by each spacecraft 12. This power problem is solved by increasing the relative power of the "high margin" control signals, and correspondingly decreasing the relative power of standard margin control signals, so the average power of each control signal is within the desired limits, but the benefits of the high margin control signals are obtained. FIGS. 6a, 6b, and 6c are simplified amplitude-time plots of the amplitude or instantaneous radiated power of three such forward control carriers.

A spacecraft-based cellular time-division multiple access communication system (10) for communication among terrestrial user terminals (16a, 16b, 16c) and terrestrial gateway terminals (14) includes a spacecraft (12) including a receiving arrangement (12r), a frequency-dependent routing arrangement (12c), a transmitting arrangement (12t), and an antenna arrangement (12a) coupled to the transmitting (12t) and receiving (12r) arrangements. The antenna arrangement (12a) forms a plurality of beams (20a, 20b, 20c, 20d, 20e) directed toward the Earth's surface (1), each in a different direction, so that each beam (20a, 20b, 20c) overlies a different terrestrial footprint (20af, 20bf, 20cf), some of which footprints (20af) may lie closer to the nadir (3) than to the horizon (5), and others of which footprints (20cf) may lie closer to the horizon (5) than to the nadir (3), the receiving arrangement (12r) being for at least receiving reverse control signals (312) transmitted over the beams (20) from at least the user terminals (16a, 16b, 16c), and for receiving forward control signals (610) transmitted over at least one of the beams (20) by way of uplink frequencies. The routing arrangement (12c) is for routing the reverse control signals and the forward control signals received by the receiving arrangement to appropriate ones of the transmitting arrangements in response to the uplink frequencies. The transmitting arrangement is for transmitting the reverse control signals and the forward control signals on at least one downlink frequency carried over one of the beams, so that the spacecraft operates in a bent-pipe manner. A plurality of the reverse and forward control signals may be transmitted from the spacecraft. The communication system 10 includes a plurality of first terrestrial user communication terminals (16a). Each of the first terrestrial user communication terminals (16a) is adapted for transmitting reverse control signals (312) to the spacecraft (12) by way of burst transmissions on at least one of the uplink frequencies (106) in a first beam (20a) associated with a particular one of the footprints (20af) within which the first terrestrial user communication terminals (16a) lie. The footprint (20af) of the first beam (20a) lies near the nadir (3). The communication system (10) also includes a plurality of second terrestrial user communication terminals (16c). Each of the second terrestrial user communication terminals (16c) is adapted for transmitting reverse control signals (312) to the spacecraft (12) by way of burst transmissions on at least one of the uplink frequencies (114) in a second beam (20c) associated with a particular one of the footprints (20cf) within which the second terrestrial user communication terminals (16c) lie. The second footprint (20cf) lies near the horizon (5). The communication system (10) includes a network control center (18) coupled to the communication system (10), for generating forward control signals (608, 611, 613) for transmission to the terrestrial user terminals (16a, 16b, 16c), for assigning time slots for transmissions to and from the terrestrial user terminals (16a, 16b, 16c) in a time-division multiple access manner, and for receiving the reverse control signals (312) during receive time slots (310, 314, 316), the durations of the receive time slots (310) selected for reception of the reverse control signals from the first terrestrial user terminals (16a being exceeded by the durations of the receive time slots (316) selected for reception of the reverse control signals from the second terrestrial user terminals (16c), whereby burst transmissions from terrestrial user terminals (16a) within footprints (20cf) lying nearer the horizon (5) than to the nadir (3), which are potentially subject to a greater range of time delays than those burst transmissions from terrestrial user terminals (16a) lying nearer to the nadir (3) than to the horizon (5), are received within longer receive time slots (316), which longer receive time slot tends to accommodate a greater range of temporal error. In a particular embodiment of the invention, the spacecraft (12) includes a solar panel (12s) and power supply (12pc) arrangement which produces electrical power for energizing the spacecraft (12) and for generating the energy to be transmitted over the beams (20a, 20b, 20c), and in this embodiment the network control center generates a single control signal carrier (105, 109, 113) for each of the spot beams (20a, 20b, 20c) in order to reduce to a minimum the power requirements on the solar panel (12s) and power supply (12pc) arrangement. In a communication system in which communications are desired between the terrestrial user terminals (16a, 16b, 16c) and a public switched telephone network (8), the system (10) further comprises at least one gateway terrestrial terminal (14) coupled to the public switched telephone network (8) and communicating with the spacecraft (12) under the control of the network control center (18), so that information signals may be routed among the terrestrial user terminals (16a, 16b, 16c) and users of the public switched telephone network. The network control center (18) may be physically located separate from the gateway terrestrial terminal (14).

Other embodiments of the invention will be apparent to those skilled in the art. For example, while network 8 has been described as a land-line network, it may include spacecraft or terrestrial light or microwave links. While the user terminals 16 are described as being ground-based or terrestrial, those skilled in the art will know that this includes airborne, marine and submarine users. The number of spot beams in the cellular communication system 10 is preferably greater than the five beams illustrated in FIG. 1. While the signals flowing between the spacecraft 12 and the gateway (s) 14 and NCC 18 have been described as being communicated at C-band, and the signals to and from the user terminals have been described as being at L-band, any frequency bands may be used which lie within the state of the art.

What is claimed is:

1. A spacecraft-based cellular time-division multiple access communication system for communication among terrestrial user terminals and terrestrial gateway terminals, said communication system comprising:

a spacecraft including a receiving arrangement, a frequency-dependent routing arrangement, a transmitting arrangement, and an antenna arrangement coupled to said transmitting and receiving arrangements, which antenna arrangement forms a plurality of beams directed toward the Earth's surface, each in a different direction, so that each beam overlies a different terrestrial footprint, some of which footprints may lie closer to the nadir than to the horizon, and others of which footprints may lie closer to the horizon than to said nadir, said receiving arrangement being for at least for receiving reverse control signals transmitted over said beams from at least said user terminals, and for receiving forward control signals transmitted over at least one of said beams by way of uplink frequencies, said routing arrangement being for routing said reverse control signals and said forward control signals received by said receiving arrangement to appropriate ones of said transmitting arrangements in response to said uplink frequencies, and said transmitting arrangement being for transmitting said reverse control signals and said forward control signals on at least one downlink frequency carried over one of said beams, whereby said spacecraft operates in a bent-pipe manner, and a plurality of said reverse and forward control signals may be transmitted from said spacecraft;

a plurality of first terrestrial user communication terminals, each of said first terrestrial user communication terminals being adapted for transmitting reverse control signals to said spacecraft by way of burst transmissions on at least one of said uplink frequencies in a first beam associated with a particular one of said footprints within which said first terrestrial user communication terminals lie;

a plurality of second terrestrial user communication terminals, each of said second terrestrial user communication terminals being adapted for transmitting reverse control signals to said spacecraft by way of burst transmissions on at least one of said uplink frequencies in a second beam associated with a particular one of said footprints within which said second terrestrial user communication terminals lie;

a network control center coupled to said communication system, for generating forward control signals for transmission to at least said terrestrial user terminals, for assigning time slots for transmissions to and from said terrestrial user terminals in a time-division multiple access manner, and for receiving said reverse control signals during receive time slots, the durations of said receive time slots selected for reception of said reverse control signals from said first terrestrial user terminals being exceeded by said durations of said receive time slots selected for reception of said reverse control signals from said second terrestrial user terminals, whereby burst transmissions from terrestrial user terminals within footprints lying nearer said horizon than to said nadir, which are potentially subject to a greater range of time delays than those burst transmissions from terrestrial user terminals lying nearer to said nadir than to said horizon, are received within longer receive time slots, which longer receive time slot tends to accommodate a greater range of temporal error.

2. A system according to claim 1, wherein:

said spacecraft further includes a solar panel and power supply arrangement which produces electrical power for energizing said spacecraft and for generating the energy to be transmitted over said beams; and said network control center generates a single control signal carrier for each of said spot beams in order to reduce to a minimum the power requirements on said solar panel and power supply arrangement.

3. A system according to claim 1, wherein communications are desired between said terrestrial user terminals and a public switched telephone network, said system further comprising at least one gateway terrestrial terminal coupled to said public switched telephone network and communicating with said spacecraft under the control of said network control center, so that information signals may be routed among said terrestrial user terminals and users of said public switched telephone network.

4. A system according to claim 3, wherein said network control center is physically located separate from said one gateway terrestrial terminal.

* * * * *